Nov. 7, 1961
A. M. KRAATZ
3,007,360
APPARATUS FOR SELECTIVE SHEARING OF CONTACTS
FROM TAPES INCLUDING MEANS TO RETRACT
HOSE TAPES NOT BEING SHEARED
Filed March 9, 1959
3 Sheets-Sheet 1
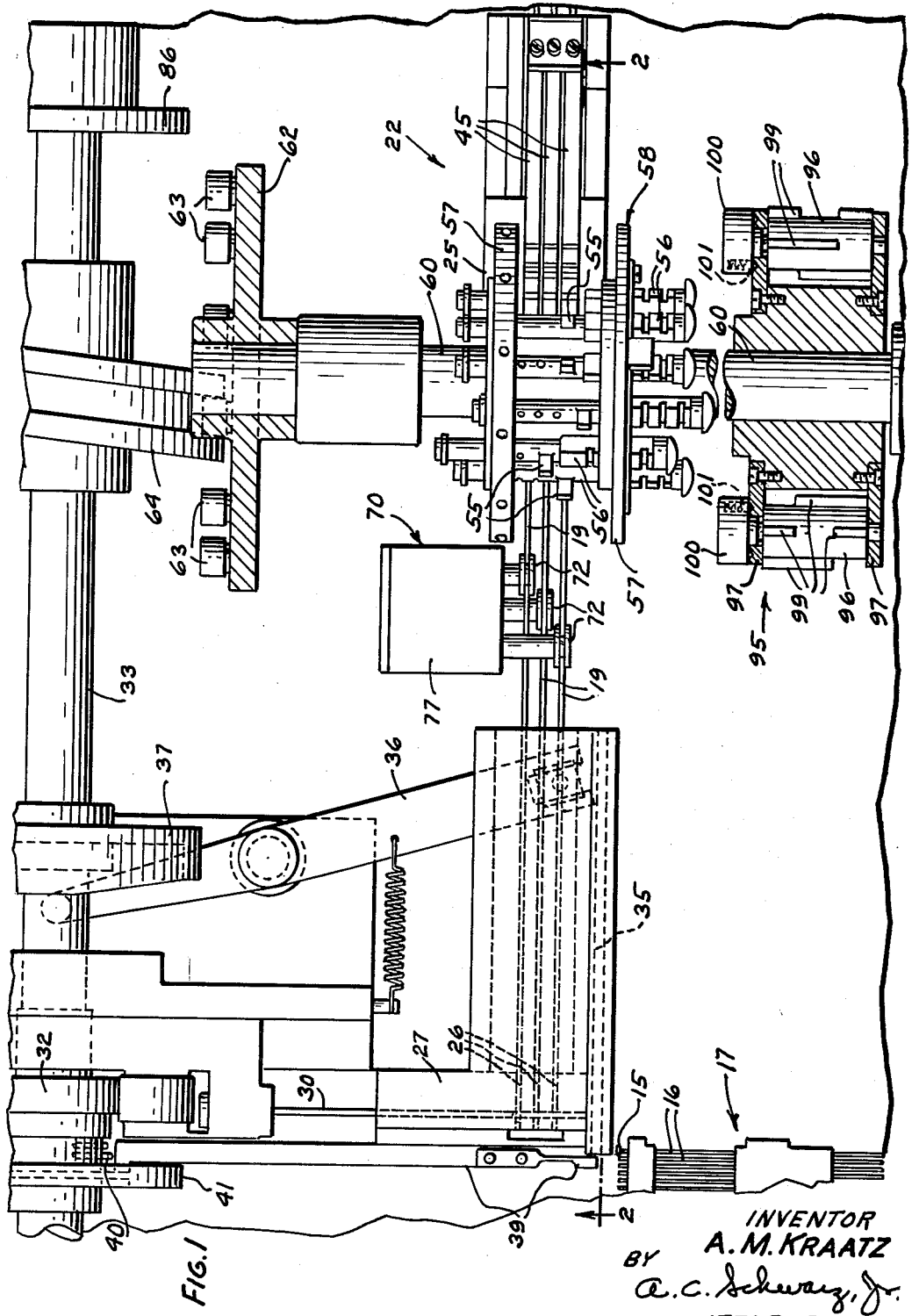
FIG.I
INVENTOR
A. M. KRAATZ
BY
A.C. Schwarz, Jr.
ATTORNEY Nov. 7, 1961
A. M. KRAATZ
3,007,360
APPARATUS FOR SELECTIVE SHEARING OF CONTACTS
FROM TAPES INCLUDING MEANS TO RETRACT
HOSE TAPES NOT BEING SHEARED
Filed March 9, 1959
3 Sheets-Sheet 2
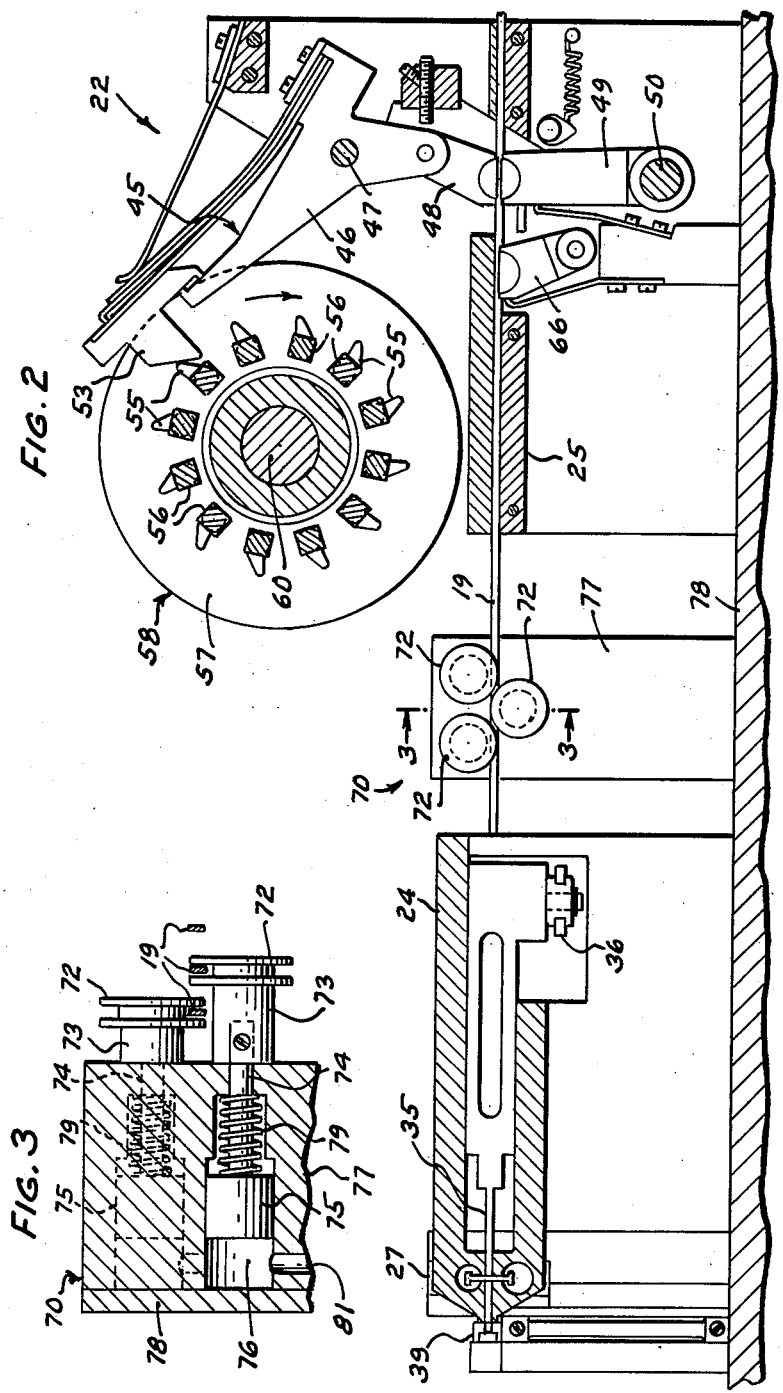
INVENTOR
A. M. KRAATZ
BY
a.c. Schwarz, Jr.
ATTORNEY Nov. 7, 1961
A. M. KRAATZ
3,007,360
APPARATUS FOR SELECTIVE SHEARING OF CONTACTS
FROM TAPES INCLUDING MEANS TO RETRACT
HOSE TAPES NOT BEING SHEARED
Filed March 9, 1959
3 Sheets-Sheet 3
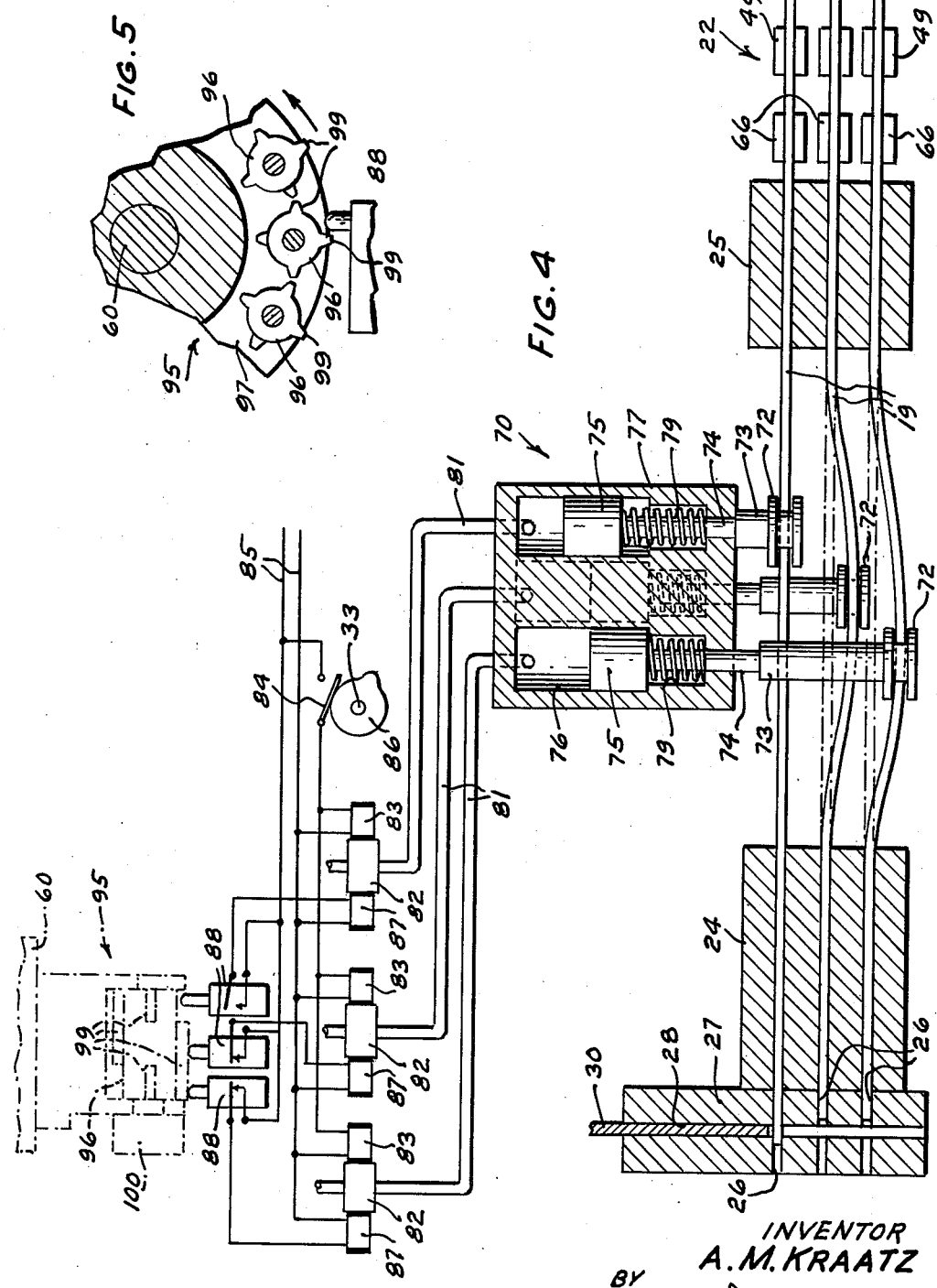
INVENTOR
A. M. KRAATZ
BY
a.c. Schwarz, Jr.
ATTORNEY United States Patent Office 3,007,360
Patented Nov. 7, 1961

3,007,360
APPARATUS FOR SELECTIVE SHEARING OF CONTACTS FROM TAPES INCLUDING MEANS TO RETRACT HOSE TAPES NOT BEING SHEARED
Albert M. Kraatz, North Riverside, Ill., assignor to Western Electric Company, Incorporated, New York, N.Y., a corporation of New York
Filed Mar. 9, 1959, Ser. No. 797,934
5 Claims. (Cl. 83—206)

This invention relates to apparatus for shearing contacts from a plurality of different types of tapes, and more particularly to a mechanism for selectively feeding the tapes into a die and for retracting slightly the tapes not being sheared while a contact is being sheared from one of the tapes.

In one type of apparatus for shearing contacts from a plurality of tapes of different types, the tapes are selectively fed individually through transverse apertures arranged in a row in a shearing die and across a punch aperture in the die and a contact is sheared from the tape by a punch. When the contacts are sheared, small fins are formed on the ends of the tapes and these fins extend slightly into the punch aperture and frequently cause deformation of contacts subsequently sheared from some of the tapes and moved across the fins of the other tapes.

An object of the present invention is to provide an improved apparatus for shearing contacts from tapes.

Another object of the invention is the provision in an apparatus for selectively feeding tapes of different types into a shearing punch and die and shearing contacts therefrom of a mechanism for selectively retracting the tapes which are not being sheared from the path of movement of the punch to avoid engagement of the ends of the tapes with the contacts sheared from other tapes.

With these and other objects in view, the invention contemplates the provision of a die having a longitudinal aperture for slidably supporting a shearing punch and having a plurality of transverse apertures arranged in a row for guiding tapes of different types across the longitudinal aperture and supporting the individual tapes in the path of the punch. Feeding means are provided for selectively feeding the tapes individually into shearing position in the die in the path of the punch, and the punch is actuated to shear a contact therefrom. A plurality of movable tape guides engageable with the tapes between the shearing die and the feed means have actuators therefor which are selectively operable to laterally deflect a portion of the tapes not being sheared to cause the ends thereof to be retracted from the path of the punch so that they will not engage the contact sheared from the other tape as the sheared contact is carried past the retracted tapes by the punch.

Other objects and advantages of the invention will become apparent by reference to the following detailed description thereof and the accompanying drawings, in which:

FIG. 1 is a fragmentary plan view of a contact forming and welding machine showing the invention therein;

FIG. 2 is a fragmentary vertical sectional view of the apparatus taken along line 2—2 of FIG. 1;

FIG. 3 is an enlarged fragmentary vertical sectional view through the tape-deflecting mechanism taken on line 3—3 of FIG. 2;

FIG. 4 is a fragmentary diagrammatic view of the tape-deflecting mechanism and the control therefor showing two of the tapes in laterally deflected and retracted positions; and FIG. 5 is a detailed partial sectional view through the control members for effecting the actuation of the tape-deflecting members.

Referring to FIG. 1 of the drawings, electrical contacts 15 to be welded onto the end of wires 16 of a wire spring relay 17 are sheared from a plurality of contact tapes 19. These tapes are fed from supplies thereof by a tape-feeding mechanism 22 which advances the tapes selectively step by step through guideways in longitudinally spaced guide members 24 and 25 (FIG. 4) and into transverse apertures 26, 26 in a shearing die 27. The shearing die 27 has a longitudinal aperture 28 intersecting the tape apertures 26 for receiving a shearing punch 30 therein which cooperates with the shearing edges formed by the longitudinal and transverse apertures 28 and 26, respectively, for shearing contacts 15 from the tapes 19.

The punch 30 is reciprocated by a cam 32 on a cam shaft 33 of the apparatus, and the punch 30, after shearing a contact 15 from one of the tapes 19, advances the contact to a predetermined position in the path of a transverse slide 35. This slide 35 is actuated through a lever 36 and a cam 37 on the cam shaft 33 and serves to transfer the contact 15 to a welding electrode 39. The electrode 39 is actuated by a spring 40, and a retracting cam 41 to advance the contact 15 into percussive engagement with the end of the wire 16 and in cooperation with a welding circuit to effect the percussive welding of the contact 15 onto the wire 16. The machine for shearing contacts and welding them onto the wires of the relay parts is shown in more detail in the E. W. Larsen Patent No. 2,749,419, issued June 5, 1956.

The selective tape-feeding device 22 (FIGS. 1 and 2) comprises three tape-feeding mechanisms 45, one for each of the three tapes 19. Each of the tape-feeding mechanisms comprise a composite lever 46 pivotally fulcrumed on a rod 47 and pivotally connected to a depending gripping jaw 48 which cooperates with a jaw 49 pivotally therebetween and advancing it a predetermined distance mounted on a stationary rod 50 for gripping the tape 19 therebetween and advancing it a predetermined distance in response to actuation of the lever 46. The levers 46 have cams 53 thereon which cooperate with cam elements 55 on bars 56 adjustably supported in a pair of discs 57 of a carrier 58. Each bar 56 has only one cam element 55 thereon and the bars 56 may be adjusted laterally to position the cams 55 thereon in alignment with the cam 53 of any of the three levers 46 or in a neutral position aligned with none of them.

The carrier 58 is fixed to a shaft 60 which is suitably supported on the apparatus and has a disc 62 secured thereto which has cam rollers 63 thereon cooperable with a cam 64 on the cam shaft 33 for indexing the carrier 22. The rods 56 and cams 55 of this selectively operable tape-feeding mechanism which is disclosed more fully in Patent No. 2,803,665, issued August 13, 1957 to R. O. Birchler, may be adjusted to selectively feed the tapes 19 in any desired pattern.

It will be understood that as the carrier 58 is indexed, a cam element 55 engages and actuates a cam 53 on the lever 46 and rocks the lever 46 of a selected one of the three tape-feed mechanisms 45 to cause the jaws 48 and 49 to grip the tape 19 therebetween and advance it a predetermined distance into the die 27 and across the longitudinal recess 28. Holding pawls 66 are provided for holding the tapes 19 against retraction.

During the shearing of a contact 15 from a contact tape 19, a slight fin is usually formed on the end of the tape which fin is positioned in the longitudinal aperture 28 of the die 27 and frequently deforms a contact severed from one tape and carried past the fins on the other tapes 19 by the punch 30.

In order to eliminate this objectionable deformation of the contacts 15 during the formation thereof, a tape-retracting mechanism 70 is provided for selectively retracting the tapes slightly to position the ends thereof with the fins thereon in spaced relation to the longitudinal aperture 28 and out of the path of movement of the severed contact. The tape-retracting device 70 comprises a plurality of movable tape guides 72, one for each of the tapes 19, which are circular in shape and have peripheral grooves forming pairs of annular flanges for receiving the tapes 19 therebetween. The tape guides 72 have hubs 73 secured to piston rods 74 of pistons 75 which are reciprocable in cylinders 76 formed in a block 77 secured to the horizontal frame plate 78 of the apparatus. Springs 79 urge the pistons and the tape guides 72 in one direction to normally retracted positions with the hubs 73 in engagement with the block 77. The pistons 75 and the tapes guides 72 are adapted to be moved a predetermined distance in the opposite direction by compressed air admitted to one end of the cylinders 76 from a source of compressed air through airlines 81.

In their normal retracted position, the tape guides 72 are in alignment with the guideways in the guide members 24 and 25 for guiding the tapes in a straight line into the transverse apertures 26 of the shearing die 27. In response to actuation of the tape guides 72 to their forward positions, (FIG. 4) the tapes are moved laterally to form a bowed portion therein. Inasmuch as the tapes 19 are yieldably gripped and held by the holding pawls 66, the lateral movement of the tapes by the tape guides 72 serve to retract the free ends thereof slightly in the apertures 26 in the shearing die 27 and thus position the ends of such retracted tapes out of the path of movement of the punch 30 and the contact 15 carried thereby in the aperture 28 so that there is no possibility of the fins or the ends of such tapes engaging and multilating the shearing contact 15 carried by the punch 30.

The flow of compressed air into the cylinders 76 is controlled by valves 82 (FIG. 4) which are moved to normal inoperative positions by solenoids 83 which are connected in series with a normally open switch 84 to a power source 85. The switch 84 is actuated to closed position by a cam 86 on the cam shaft 33 to effect the energization of the solenoids 83 and the movement of the valves 82 to their normal inoperative positions in which they cut off the air to the cylinders 76 and allow any air therein to exhaust.

The valves 82 are actuated to their operative positions by solenoids 87 to admit compressed air to the cylinders 76 to effect the actuation of the tape guides 72 to their forward positions and the retraction of the ends of the tapes 19 in the die 27. The solenoids 87 are controlled by switches 88 which are suitably supported in a row on the horizontal frame member 78 for actuation by a selectively operable tape-retracting control device 95 (FIGS. 1, 4 and 5).

The device 95 is secured to the shaft 69 and comprises a plurality of adjustable actuating members 96 equal in number to the rods 56 on the carrier 58. The actuating members 96 are rotatably supported in a pair of discs 97 of the device and each member 96 has a plurality of cams 99 disposed about the periphery thereof in angularly spaced relation to each other and in different positions axially thereon. Three of the cams 99 are arranged to effect selective actuation of any two of the three switches 88 and the fourth cam 99 is capable of actuating all of the switches 88 when no contact 15 is to be welded onto a wire 16 of the relay 17. Each of the actuating members 96 has a handle 100 and may be manually adjusted about its axis to dispose selected ones of the cams 99 in operative position for actuating the switches 88. Spring-pressed detents 101 (FIG. 1) in the handles 100 cooperate with recesses in the discs 97 for releasably holding the actuating members 96 in set positions.

The actuating members 96 on the device 95 and the bars 56 on the carrier 58 are set to predetermined positions in accordance with the selected arrangement of types of contacts 15 to be welded onto the wires 16 of the relays 17. Then, as the carrier 58 and the device 95 are indexed step by step, the tapes 19 are selectively advanced and the operative cams 99 on successive actuating members 96 momentarily actuate selected pairs of the normally open switches 88 to closed position to effect the movement of selected pairs of the tape guides 72 to their advanced positions to bow the tapes 19 not being severed and cause the retraction of the end portions thereof during the contact-shearing operations. After the shearing of the contact 15 from the tape has been completed, the cam 86 closes the switch 84 to effect the energization of the solenoids 83 and the actuation of the valves 82 to their normal inoperative positions thereby cutting off the air to the cylinders 76 and causing the tape guides 72 and the deflected portions of the tapes 19 to be returned to their normal positions by the action of the springs 79.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In an apparatus for shearing contacts from a plurality of different types of tapes, a reciprocable shear punch, a die having a longitudinal aperture for slidably receiving said shear punch and having a plurality of transverse apertures arranged in a row for guiding the tapes across the path of said punch and having shearing edges cooperable with the punch for shearing contacts from the tapes, means for selectively feeding the tapes individually in said transverse apertures across said longitudinal aperture in said die, means for actuating said punch to shear contacts from said tapes, and means for selectively retracting the ends of the tapes not being sheared during a contact-shearing operation.

2. In an apparatus for forming contacts from a plurality of different types of tapes, a reciprocable shear punch, a die having a longitudinal aperture for slightly receiving said shear punch and having a plurality of transverse apertures arranged in a row for guiding the tapes across the path of the punch and having shearing edges cooperable with the punch for shearing contacts from the tapes, means for selectively feeding the tapes in said transverse apertures across said longitudinal aperture in said die, means for actuating said punch to shear contacts from said tapes, a plurality of guide members engageable with the tapes individually between said tape-feeding means and said die, means for mounting said guide members for movement transversely of said tapes to a normal first position for guiding the tapes along a straight path into said transverse apertures in said die and to a second position for moving portions of the tapes laterally to effect the retraction of the end portions of the tapes in said die, and means for selectively actuating said guide members to effect the retraction of the tapes not being sheared during a contact-shearing operation.

3. In an apparatus for forming contacts from a plurality of different types of tapes, a reciprocable shear punch, a die having a longitudinal aperture for slidably receiving said shear punch and having a plurality of transverse apertures arranged in a row for guiding the tapes across the path of said punch and cooperable with said punch for shearing the contacts from the tapes, means mounted in spaced relation to the die for selectively feeding the tapes individually in said transverse apertures across said longitudinal aperture in said die, locking means adjacent said tape-feeding means for holding the tapes against retraction, deflecting means engageable with the tapes between said tape-feeding means and said guide for moving the tapes laterally to effect the retraction of the ends thereof in said die, and means for selectively actuating said deflecting means to effect the retraction of the ends of the tapes not being sheared during a contact-shearing operation.

4. In an apparatus for forming contacts from a plurality of different types of tapes, a reciprocable shear punch, a die for slidably receiving said shear punch and having a plurality of transverse apertures arranged in a row for guiding the tapes across the path of said punch and cooperable with said punch for shearing contacts from the tapes, tape-feeding means for each of said tapes mounted in spaced relation to said die, locking means for each of said tapes mounted adjacent said tape-feeding means for holding the tapes against retraction, tape-deflecting means for each of said tapes engageable with the tapes between said tape-feeding means and said die for moving the tapes laterally to effect the retraction of the ends thereof in said die, means for selectively actuating said tape-feeding means to advance the tapes across the longitudinal aperture in said die, means for selectively actuating said deflecting means in timed relation to the tape-feeding means to effect the retraction of the tapes not being sheared during a contact-shearing operation, and means operable in timed relation to the tape-feeding means and the deflecting means for actuating said punch to shear contacts from the tapes.

5. In an apparatus for shearing contacts from a plurality of different types of tapes, a base, a shear punch, a die on said base having a longitudinal aperture for slidably receiving said shear punch and having a plurality of transverse apertures arranged in a row and intersecting said longitudinal aperture for guiding tapes across the path of the punch and cooperable with the punch for shearing contacts from said tapes, means on said base for selectively feeding the tapes individually in said transverse apertures across said longitudinal aperture, means on said base for actuating said punch to shear contacts from said tapes, a plurality of movable tape guides, means on said base for supporting said tape guides for engaging the tapes at points between the feed means and the punch and for the movement transversely of the tapes, means for yieldably maintaining the tape guides in a normal retracted position for guiding the tapes in a straight line into said transverse apertures in said die, actuating means for moving said tape guides individually through a predetermined distance to laterally displace intermediate portions of the tapes to effect the retraction of the free ends thereof in said transverse apertures in said die, and means for selectively operating said actuating means to effect the retraction of the tapes not being sheared during a contact-shearing operation.

References Cited in the file of this patent

UNITED STATES PATENTS

| 979,406 | Armstrong | Dec. 27, 1910 |
| 2,749,419 | Larsen | June 5, 1956 |
| 2,802,665 | Birchler | Aug. 13, 1957 |

UNITED STATES PATENT OFFICE
CERTIFICATE OF CORRECTION

Patent No. 3,007,360                    November 7, 1961

Albert M. Kraatz

It is hereby certified that error appears in the above numbered patent requiring correction and that the said Letters Patent should read as corrected below.

Column 2, line 32, for "comprise" read -- comprises --; line 35, strike out "therebetween and advancing it a predetermined distance"; column 3, lines 33 and 34, for "multilating" read -- mutilating --; column 4, line 41, for "slightly" read -- slidably --.

Signed and sealed this 3rd day of April 1962.

(SEAL)
Attest:

ERNEST W. SWIDER                    DAVID L. LADD

Attesting Officer                    Commissioner of Patents